Patented June 9, 1936

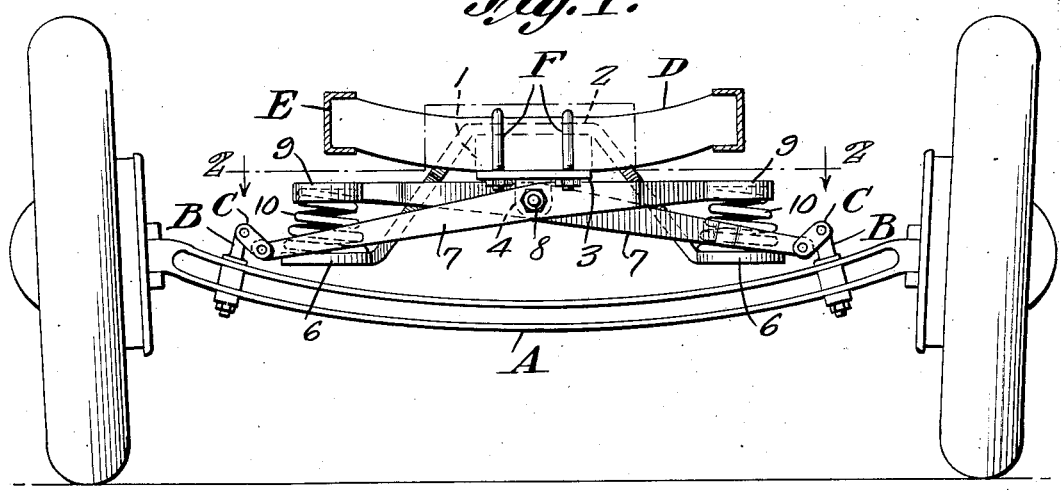
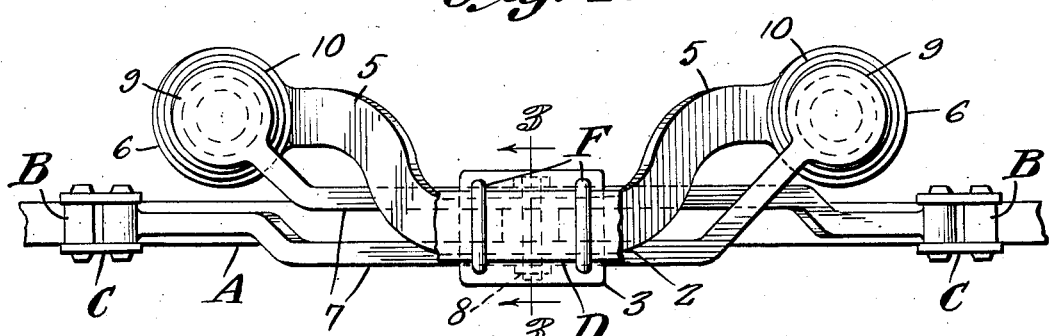
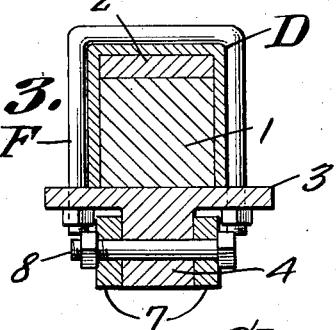

2,043,889

UNITED STATES PATENT OFFICE 2,043,889

SPRING ASSEMBLY

Stanley E. Erb, Birmingham, Ala.

Application February 11, 1935, Serial No. 6,058

2 Claims. (Cl. 267—20)

This invention relates to spring constructions for motor vehicles and its general object is to provide a spring assembly that is primarily designed to be interchangeable with or substituted for the front spring of vehicles that employ transverse front springs, to not only materially increase the riding qualities of such vehicles, in that it absorbs practically all shocks and jars but will perform its intended function for a prolonged period of time without breakage or displacement.

A further object of the invention is to provide a spring assembly for the front of a motor vehicle, that is simple in construction, inexpensive to manufacture, easy to install and extremely efficient in use and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a partial front view of a motor vehicle with my spring assembly applied thereto.

Figure 2 is a sectional view taken approximately on line 2—2 of Figure 1.

Figure 3 is a sectional view taken approximately on line 3—3 of Figure 2.

Referring to the drawing in detail, the letter A indicates the front axle of a motor vehicle, B the posts or perches, C the shackles, and D a front cross member of a vehicle frame E.

The above mentioned parts are now in general use to receive the usual spring commonly employed at the front of a vehicle of the type shown, and of course the U-bolts or clips F are likewise employed to secure the intermediate portion of the spring to the frame, but in the use of my assembly a block 1 is arranged within the channel of the front cross member D and disposed between the block 1 and the upper portion of the cross member, is the intermediate portion of a yoke 2. The block is held within the channel by a plate 3 which is provided with openings to receive the arms of the clips F, and the latter surround the cross member, with nuts received by the threaded ends of the arms thereof for securing the plate in the position as best shown in Figure 3. Formed on and depending from the plate 3 is a boss 4 that is provided with a bore extending therethrough for a purpose which will be presently apparent.

From the foregoing, it will be seen that the yoke is fixed within the cross member D, and the yoke is of a width to fit between the depending portions thereof. The arms of the yoke from the portion within the cross member D are not only inclined downwardly in diverging relation with respect to each other, but are extended rearwardly, and are thence outwardly directed as at 5, and terminate in relatively large disk-shaped ends 6 disposed rearwardly of the front axle A and normally above the plane of the intermediate portion thereof, as best shown in Figure 1.

I also employ a pair of levers 7 that are provided with openings intermediate their ends receiving the bolt of a bolt and nut connection 8 and the bolt passes through the bore of the boss 4 to be secured thereto accordingly, for pivotally mounting the levers upon opposite sides of the boss in inclined crossed relation with respect to each other. The lower ends of the levers are pivotally secured to the shackles C, and the upper ends terminate in inverted cup-shaped members 9 that are relatively smaller than the disk-shaped ends or members 6 of the yoke. The levers are of a length so that the disk-shaped members of the yoke and the cup-shaped members of the levers are arranged in cooperating pairs, with the members 9 disposed above the member 6, for the purpose of receiving graduated coil springs 10, the upper or small convolutions thereof being mounted in the cup-shaped members 9, while the lower or large convolutions are mounted on the disk-shaped members 6.

In Figure 2, it will be noted that the upper portions of the levers 7 are bent rearwardly at a point a considerable distance beyond the connection of the levers with the boss 4, and the lower portions of the levers are bent for disposal in alignment with and above the front axle.

From the above description and disclosure of the drawing it will be obvious that I have provided a spring assembly that can be easily and expeditiously substituted for the front spring of vehicles having transverse front springs, and my assembly not only acts in the form of a stabilizer to check against undesired movement of the body of the vehicle, but also acts as a shock absorber, therefore it materially increases the riding qualities of the vehicle, and to an extent which is practically impossible by the combined use of the usual spring and shock absorbers of the type now employed.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A spring assembly for vehicles comprising a block arranged in the front cross member of the frame of the vehicle, a yoke between the block and cross member and extending rearwardly and outwardly therefrom, means for securing the block and yoke member fixed to the cross member, a plate included in said means, a boss depending from the plate, a pair of levers pivoted intermediate their ends to the boss and one of their ends being pivoted to the front axle of the vehicle, cup-shaped members formed on the opposite ends of the levers, disk-shaped members formed on the opposite ends of the yoke, said cup-shaped members and disk-shaped members being relatively disposed in superimposed pairs, and coil springs mounted between and received by the members of each pair.

2. A spring assembly for vehicles comprising a pair of levers pivotally connected intermediate their ends to the frame of a vehicle for disposal in inclined cross relation with respect to each other, with the upper end portions of the levers bent at a rearward inclination and the lower end portions bent for disposal above the vehicle front axle and having their outer ends pivoted thereto, a yoke fixed to the frame above the levers and having rearwardly and outwardly curved directed portions, disk-shaped members formed on the opposite ends of the yoke, cup-shaped members formed on the ends of the rearwardly inclined upper portions of the levers and superimposed with respect to the disk-shaped members, and spring means arranged between and received by the superimposed members.

STANLEY E. ERB.